Sept. 13, 1960  H. KNOOP  2,952,120
ELASTIC LINK STRAP
Filed July 1, 1957  3 Sheets-Sheet 1

INVENTOR.
Hendrikus Knoop
BY Michael S. Striker
agt.

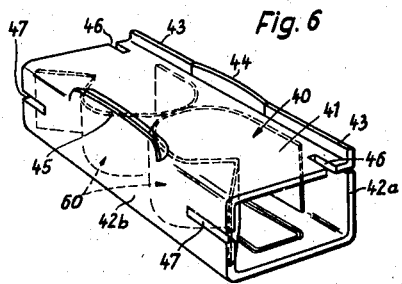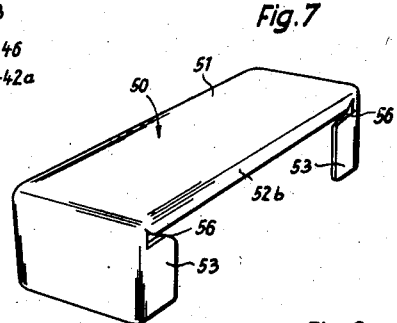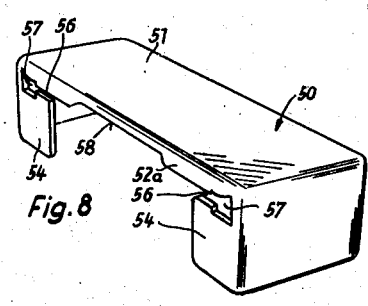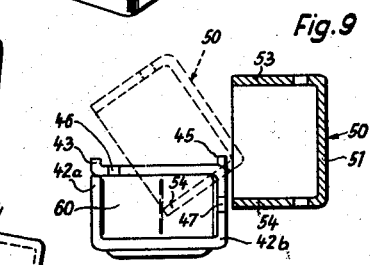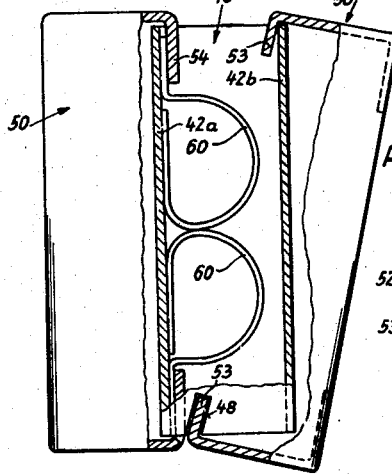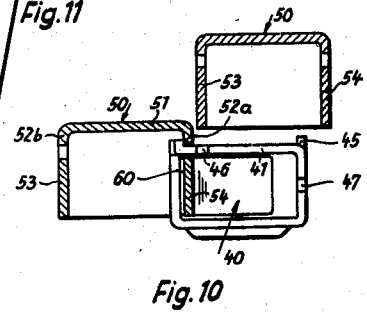

Sept. 13, 1960 H. KNOOP 2,952,120
ELASTIC LINK STRAP
Filed July 1, 1957 3 Sheets-Sheet 3
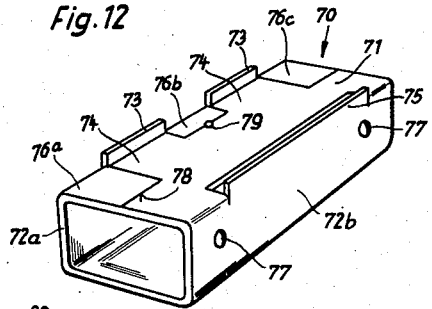
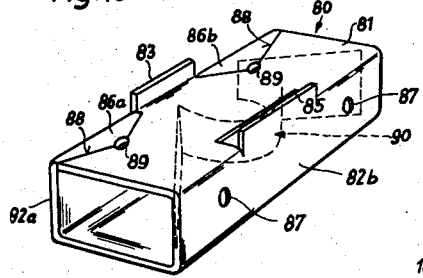
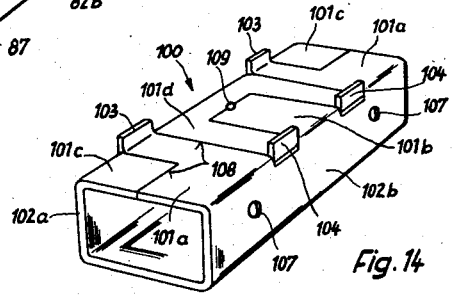
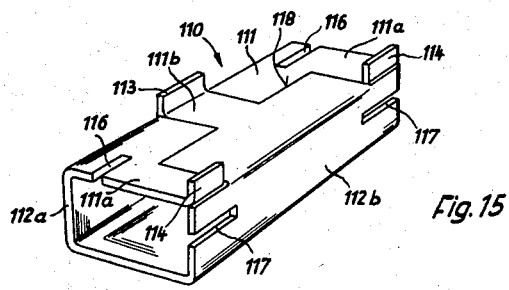
INVENTOR.
Hendrikus Knoop
BY Michael S. Striker
agt.

United States Patent Office 2,952,120
Patented Sept. 13, 1960

2,952,120

ELASTIC LINK STRAP

Hendrikus Knoop, Utrecht, Netherlands, assignor to Rodi & Wienenberger, Aktiengesellschaft, Bleichstrasse, Baden, Germany, a firm of Germany Filed July 1, 1957, Ser. No. 669,207

Claims priority, application Netherlands Sept. 12, 1956

19 Claims. (Cl. 59—79)

The present invention relates to improvements in elastic link straps for ornamental and utilitarian purposes, and especially in watch bands. More particularly the invention relates to the type of link straps which consists of a single layer of hollow main links or link casings, intermediate link elements connecting the adjacent main links, and suitably bent leaf springs within the link casings for resisting the sliding movement of the various links relative to each other in the longitudinal direction of the strap. The main links and connecting elements extend transversely to the direction of expansion of the strap and are made of stamped sheet metal pieces which are bent into shape. The side walls of each connecting element are cut out so as to leave a pair of tabs extending toward each other and having a height substantially corresponding to the inner height of the main links on each side thereof and thus connect the links with each other. The connecting elements themselves have a cover plate of elongated, substantially rectangular inverted troughlike shape which is adapted to cover up the gaps which appear between the adjacent main links when the strap is being expanded.

The link straps of the above-mentioned kind such as were known prior to this invention had a series of disadvantages, the most important of which may be described as follows:

Since the link casings are subjected to considerable traction which is frequently increased by improper handling of the strap, they must be of great tensile strength. If these links are made of seamless tubing, they are of sufficient strength but too expensive. If they are bent out of stamped pieces of sheet metal, the material must be relatively thick so that the links will not be bent back and distorted when the strap is being expanded. Although the butt joint of each link casing could be spot-welded or soldered, the cost of such method would render a mass production of the links practically impossible. The minimum thickness of the link material as thus required necessarily means that the straps are relatively thick and of clumsy appearance, which is noticeable particularly if the straps are made for ladies' watches with small and narrow links.

The one-layer link straps of prior design further permit the connecting elements to be pivoted relative to the main links about an angle of at least 90°. Such large pivotal movement considerably reduces the utility of these straps since the individual links easily turn upright and have to be turned back again into their normal position, a fact which the purchaser of the strap regards as an annoyance. Also, when such turning-back is done improperly, the strap may be damaged.

Another disadvantage of the mentioned strap designs results from the present day demand for watch straps which can be shortened at any desired point. Although there have been numerous proposals as to how this may be achieved, none of them has been able to comply with all the requirements. Such straps either necessitate the application of specially designed tools for the removal of individual links, or their design makes them unfit for mass production or increases the cost thereof considerably, or the special means on the straps permitting such removal affect their ornamental appearance. Particularly, such strap designs can often not be used for the manufacture of straps made of plated material since the attempts to remove individual links from such straps easily results in the outer surfaces thereof being marred by scratches, broken edges, and the like.

It is the principal object of the present invention to provide an elastic link strap or watch band of a new design which avoids all of the above-mentioned disadvantages.

More specifically, it is an object of the invention to provide a link strap, the individual links of which consist of very thin pieces of sheet metal which are bent into a boxlike shape in such a manner that the link casings thus formed possess a very great strength and resistance against tensile and bending stresses without requiring the butt joint of each casing to be soldered or welded.

A further object of the invention is to design a link strap which may be curved only to a limited extent in the peripheral direction of the wrist and in which the adjacent links and connecting elements cannot therefore be pivoted about an angle of 90° or more relative to each other.

Another object of the invention is to provide a link strap which may be shortened at any desired point without thereby incurring the disadvantages of similar designs as previously mentioned.

A further object of the invention is to provide a link strap which, although it fulfills all of these requirements, is of beautiful appearance, may be mass-produced, and may be so produced of various materials, such as stainless steel, plated metal, precious metal, or other materials.

These objects of the present invention are attained in link straps of the general type as described in the beginning by providing the upper wall of each link casing with short projections which are disposed within the vertical planes of the opposite side walls of the casing and extend upwardly therefrom into the troughlike depression of the cover plates of the two connecting elements associated with each casing. Each of these two cover plates is adapted to cover one-half of the link casing. When the strap is fully expanded, these upward projections will then engage with the lateral edge portions of the trough-like cover plates and thus act as stop members. Any traction exerted upon the strap which might exceed the strength of the leaf springs within the link casings will then be arrested by these stoplike projections and be transmitted to the adjacent upper walls of the link casings. Even through the strap might be improperly handled, these projections will definitely limit the extent to which the strap can be expanded, and they will also limit the degree to which the strap may be bent or curved.

In one preferred embodiment of the invention, the free end of one side wall of each link abuts against the end of the upper wall, and the projections on such upper wall are formed at one side by one or more projecting end portions thereof being bent upwardly at a right angle, and at the other side by a slit being made in a part of the upper wall and by the cut portion being bent upwardly. The projections on both sides then extend within the planes of the two side walls and form short upward extensions thereof.

Furthermore, the upwardly bent edge portion of the upper wall is preferably interrupted by a recess, and a part of the free end of the adjacent side wall, which otherwise forms the butt joint, is extended upwardly through this recess and fills it out completely. Thus, the upward projection on this side of the link casing is composed of one or more angular projections of the upper wall and the extension of the side wall.

For hooking the two tabs forming each side wall of the connecting elements into or out of the link casings, one of the side walls of each casing is provided with a pair of slots, each extending inwardly from the respective end wall. The tabs on one side of a connecting element may then be inserted through these slots into a link casing, for which purpose the connecting element is first placed vertically to the casing. Each connecting element is preferably also provided with a recess in one of its lateral edge portions adjacent to the cover plate. This recess has a width corresponding to the width of the projection on the side wall of the link casing which is cut out of the upper wall thereof and bent upwardly. Therefore, after the connecting element has been inserted into the link casing, it may be slid easily over this projection. When the strap is fully expanded, the narrow side edge portion of each connecting element in which the mentioned recess is provided will then abut against the upwardly bent edge portion of the upper wall of the link casing and the upward extension of the side wall. The other connecting element which is then inserted into each link casing through the two slots in the side wall thereof will then abut against the cutout projection on the other side wall of the link casing when the strap is in the fully expanded position. When the strap is being assembled, it is therefore necessary to push this side edge portion of the second connecting element over the cutout projection on the link casing, which may be done very easily since this projection will yield resiliently in this direction, that is, toward the upper wall of the link casing from which it has been cut out. If the strap is to be disassembled, however, it is necessary to lift this side edge portion of the second connecting element over the cutout projection on the link casing by bending the projection inwardly since the latter is practically rigid in the outward direction, that is, away from the upper wall. The cutout projection is therefore provided with a notch in its upper edge, and the side edge portion of the connecting member which abuts against his cutout projection when the strap is expanded is provided with a corresponding notch. A pointed tool may then be inserted through the hole formed by these two notches so as to lift the side edge portion of the connecting member over the cutout projection on the link casing.

According to a modification of the invention, it is also possible to facilitate the assembly and disassembly of the link strap by providing a slot in the upper wall of the link casing and extending inwardly of one or both outer edges which form a part of the longitudinal sides of the strap. This slot is located near the upwardly bent edge of the upper wall and is preferably spaced from the inner surface of the adjacent side wall by the thickness of the material of the leaf springs when pressed flat plus the thickness of the material of the tabs on the connecting elements which rest upon the outer ends of the springs. When the strap is in the expanded position, the tabs on one of the two connecting elements which are to engage into one link casing may be inserted into or removed from such casing through such slot or slots. Thus, due to the recess in its side edge, the first connecting element which is to be hooked into a link casing may be inserted through the slots in the side wall of the casing and be tilted over the cutout projection, while the second connecting element, as just described, may be hooked into the same link casing by being inserted through the slot or slots in the upper wall thereof after the first connecting element has been moved over to the other side wall and been stretched out so that its tabs flatten out the ends of the leaf springs completely in the link casing. Although the upper wall of each link casing may be provided with two such slots in the opposite ends thereof so as to extend parallel to the upwardly bent edge, it is also possible to provide only one slot in one end and so as to extend in a substantially diagonal direction toward the other end of the other side wall. When the strap is then expanded the second connecting element may then be inserted or removed by being turned diagonally so that one tab thereon will pass into or out of the diagonal slot, while the opposite tab is inserted into or withdrawn from the opposite open end adjacent to the other side wall. In this embodiment of the invention, it has also been found advisable to make the slot or slots in the upper wall of the link casing shorter than the slots in the side wall thereof, and to make the tabs at one side of the connecting elements shorter than those at the other side in accordance with the difference in the length of the two sets of slots in the link casings.

Since the projections on each link casing which are disposed within the plane of the side walls thereof are directly secured to the upper wall, one-half of which is covered on each side by the inverted troughlike cover plate of the two adjacent connecting elements, and since they project into these cover plates, any excessive tensile stresses will be transmitted by these projections directly into the upper wall of the link casing and will therefore neutralize each other in that wall. Such excessive stresses can therefore not unbend the link casings and they may therefore be safely made of a very thin material. However, the projections not only limit the extent to which the strap may be expanded by engaging with the lateral edge portions of the inverted troughlike cover plate, but they also prevent any excessive bending or curving of the strap in the peripheral direction of the wrist, and they especially prevent the link casings and connecting elements from being pivoted about an angle of 90° or more relative to each other.

According to a further modification of the present invention, each link casing may also be bent from a piece of sheet metal so that the butt joint thereof will be located within the upper wall of the casing which carries the stop like projections and is covered by the two hollowed plates of the adjacent connecting elements. For this purpose, the butt joint preferably extends along polygonal lines and in such a manner that, when the strap is being expanded or bent, the tensile stresses which are transmitted by the projections to the upper wall of the link casing have the tendency to close the butt joint. Consequently, the greater the tensile stresses are, the more firmly the respective edge surfaces will be pressed against each other. The polygonally extending butt joint results in interengaging upper-wall portions which are directly connected with both opposite side walls of each casing. At least one upper wall portion extends continuously from the bent upper edge of one side wall to the opposite side wall where it terminates in at least one upwardly bent projection. The projection in line with the opposite side wall may then be attained, as already described, by cutting at least one tab on three sides out of the upper wall and bending it upwardly so as to extend within the same plane as the adjacent side wall. The polygonal butt joint may, however, also be formed by extending at least one upper wall portion from each side wall to the opposite side wall where each portion then terminates in at least one upwardly bent projection. In order to prevent any resistance or undue friction between the edges of the butt joint and the connecting elements if the abutting edges of the joint are not entirely flush with each other, the butt joint may also be formed so as to terminate immediately adjacent to the bent upper edge between one side wall and the upper wall carrying the upward projections, and to extend substantially diagonally of the surface of the upper wall for a length corresponding to the length of the tabs on the connecting elements.

By placing the butt joint into the upper wall of the link casing and by providing the projections on the upper wall in such a manner that the butt joint will close when the lateral edge portions of the connecting elements engage against the projections, it will also be possible to hook the tabs of the connecting elements in still another manner into and out of the link casing. This modification consists in the provision of at least one aperture between the abutting edges of the joint through which a suitable tool may be inserted for bending the adjacent edges so far apart against the resilient force of the link material that a slot will be formed through which the tabs of the connecting elements may be inserted into or removed from the link casing. A link construction of this type, however, then also requires one or more apertures in one of the side walls of the link casing through which a similar tool may be inserted for pressing against the outer ends of the leaf springs to bend them back toward the inside of the opposite side wall so that the tabs of the connecting elements may then be hooked into the casing. This possibility of inserting the connecting tabs does, however, not exclude the other possibility as first mentioned, namely, by the provision of slots in the upper wall and in one of the side walls of the link casing. The tabs on the two sides of each connecting element may therefore have different lengths; one of the side walls of each link casing may have two slots extending inwardly from the outer ends for the insertion of the longer tabs of one connecting element; and these tabs may engage with the outer ends of the leaf springs within the link casings and flatten out these ends when the strap is being expanded. Finally, two slots may be provided in the upper wall of each link casing at a point close to the side wall opposite to the slotted side wall. The shorter tabs of the second connecting element to be inserted into each link casing may then be hooked into the same after the leaf springs had been flattened out completely by pulling the first-inserted connecting element in the direction of expansion of the strap. Thus, when the strap has been finally assembled, these shorter tabs of each second connecting element will engage against the slotted side wall of the respective link casing.

Still another modification of the invention is applicable to link casings as described which are provided with slots through which the tabs of the connecting elements are inserted. Since the guiding slots on each connecting element, that is, the slots formed between the tabs and the lateral edge portion of the hollowed cover plate, have a width substantially corresponding to the thickness of the upper wall of the link casing which is slidable along these guiding slots, it may occur that, when the strap is being expanded and when the longer tabs of the connecting elements then reach the point of the shorter slots in the upper wall of the link casing, the edges of the two pairs of slots may interfere with each other, wedge against each other, prevent a further expansion movement, and lock the two parts together so that they cannot again contract when the strap is released. In order to avoid this and to insure a proper sliding movement of the tabs along the upper wall of each link casing, the guiding slots in the connecting elements are preferably provided with an enlargement near the outer end walls of the elements. These enlargements should have a length at least equal to the length of the slots in the upper wall of the casing so that only the end portions of the longer tabs are in sliding engagement with the upper wall of the casing and these tabs slide thereon entirely free of the slot edges of the upper wall.

Further objects, features, and advantages of the present invention will appear from the following detailed description thereof, particularly when read with reference to the accompanying drawings, in which—

Fig. 6 shows a perspective view of a link casing according to a modification of the invention;

Fig. 7 shows a perspective view of a connecting element to be used in combination with the link casing according to Fig. 6;

Fig. 8 shows a perspective view of the connecting element according to Fig. 7, but seen from the other side;

Fig. 9 shows an end view, partly in section, of a link casing and a connecting element according to Figs. 6 to 8;

Fig. 10 shows a link casing and two connecting elements in a cross section taken through the connecting elements in the longitudinal direction of the strap;

Fig. 11 shows a plan view partly in cross section of another modification of the invention with one link casing and two connecting elements; while Figs. 12 to 15 show perspective views of four other modifications of the link casing according to the invention.

Figure 1:
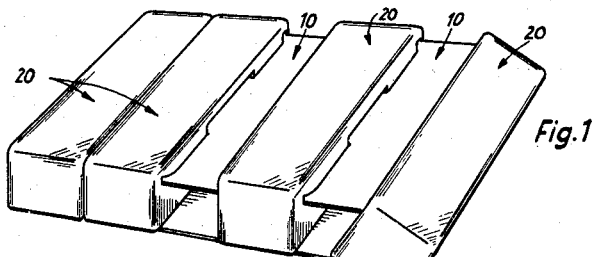
Fig. 1 shows a perspective view of a portion of a link strap according to the present invention, partly in an expanded and partly in a contracted position.
Figure 2:
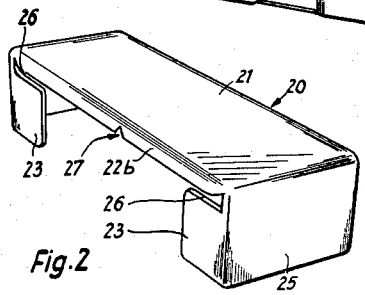
Fig. 2 shows a perspective view of a connecting element of a link strap according to Fig. 1.
Figure 3:
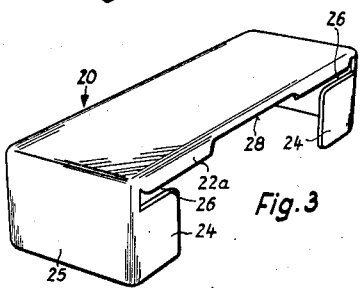
Fig. 3 shows a perspective view of the same connecting element, but as seen from the other side.
Figure 4:
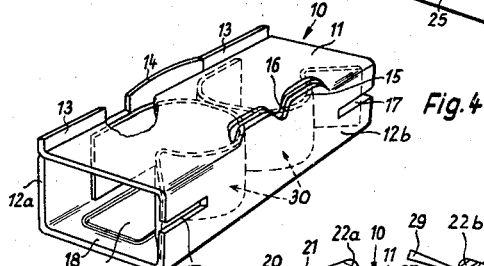
Fig. 4 shows a perspective view of a link casing according to the invention.

Referring to the drawings, and first particularly to Figs. 1 to 5, the link strap according to the invention consists of three different parts, namely, the link casings 10, as shown in Fig. 4, the connecting elements 20, as shown in Figs. 2 and 3, and the leaf springs 30 which are inserted into the link casings.

Each link casing 10 is made of a stamped piece of sheet metal which is bent into shape so that the outer end of the upper wall 11 rests flatly upon the outer edge surface of the side wall 12a. At the line of engagement with side wall 12a, the upper wall 11 is provided with short but relatively wide end portions 13 projecting vertically upward therefrom and separated by a central recess into and through which an extension 14 of side wall 12a projects. The two lateral upward projections 13 of the upper wall 11 are adapted to serve as stops for engagement with the lateral edge portion 22a of the inverted troughlike cover plate 21 of a connecting element 20. Opposite to projection 14, a tablike portion 15 is cut out of the upper wall 11 directly adjacent to side wall 12b and bent upwardly so as to be within the same plane as side wall 12b. This tablike portion 15 which has a central notch 16 thus forms the other projection on the upper wall 11. Side wall 12b also has a pair of slots 17 extending inwardly from the outer ends thereof. These slots 17 are adapted to serve as apertures for the insertion of a pair of tabs 23 or 24 of a connecting element 20 into link casing 10 or their withdrawal therefrom. The lower wall 18 of link casing 10 is preferably provided with a rectangular inner depression 19 resulting in a similar projection on the lower surface. This projection on each link casing 10 is adapted to serve as a spacing means to reduce the area of contact between the link strap and the wrist of a person wearing the same.

As already partly mentioned, each connecting element 20 consists of a plate 21 of a rectangular, inverted troughlike shape with lateral edge portions 22a and 22b, and a pair of tabs 23 and 24 on each side which are connected with each other and with plate 21 by end walls 25. Edge portions 22a and 22b and tabs 23 and 24, respectively, are separated from each other by slots 26 having a width substantially corresponding to the thickness of the material of the upper wall 11 of link casing 10. The lateral edge portion 22b of connecting element 20 has a central notch 27, and the opposite edge portion 22a has a wider central recess 28 of a width corresponding to the width of projection 15 on the upper wall 11 of link casing 10. When the link casings and connecting elements are in the assembled condition, notch 27 in edge portion 22b of each connecting element 20 is directly opposite to and in line with notch 16 in projection 15 of the adjacent link casing 10 so that, when edge portion 22b is in engagement with projection 15, notches 16 and 27 together form an aperture through which a pointed tool 29 may be inserted, as shown in Fig. 5, in order to separate the respective connecting element from the adjacent link casing when the link strap is to be shortened or disassembled.

The method of assembling and disassembling the link strap may be described as follows with reference to Fig. 5. After the bent leaf springs 30 are inserted into a link casing 10, as shown in Fig. 4, the two tabs 24 of a connecting element 20, as shown in Fig. 3, are inserted into casing 10 through slots 17 in the manner as shown, for example, in Fig. 9. During such insertion, tabs 24 have passed completely through slots 17, the connecting element is pivoted over to its normal position, as also indicated in dotted lines in Fig. 9, and the edge of recess 28 in edge portion 22a of the connecting element 20 slides over the projection 15 on link casing 10. When in its normal position, connecting element 20 may then be pulled toward the left against the action of springs 30 until it reaches approximately the position indicated in Fig. 5. It is then possible to insert the second connecting element 20 into link casing 10 by passing its tabs 23 through the same slots 17 again after placing this element substantially vertical to the link casing. After tabs 23 have passed completely through slots 17, this second connecting member 20 may be pivoted upwardly and pushed over projection 15, since this projection will yield resiliently in the direction toward the central extension 14 of side wall 12a. In the expanded position, tabs 23 of the second connecting element 20, that is, in Fig. 5, the element at the right of the horizontal link casing 19, will then engage directly with side wall 12b, while tabs 24 of the first connecting element at the left of link casing 19 engage with and flatten out the bent ends of springs 30 and thus only indirectly engage with the other side wall 12a. If the link strap is pulled out excessively, the tensile stresses will then be transmitted from the lateral edge portions 22a and 22b of connecting elements 20 to projections 13 and 15 of link casing 10 and thus into the upper wall 11 thereof. As clearly noticeable in Fig. 5, the butt joint between the end of side wall 12a and projection 13 or the lower outer edge of the upper wall 11 of the link casing will therefore not be subjected to any tensile or bending stresses and cannot split apart, even though the link casing is made of very thin material.

Figure 5:
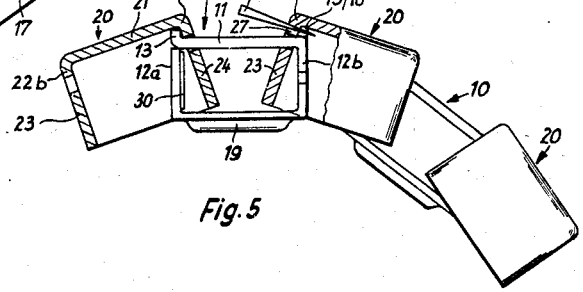
Fig. 5 shows an end view partly in section of a portion of a link strap in the expanded position.

For taking the strap apart, it is first expanded to the position as illustrated in Fig. 5. A pointed tool 29 is then inserted through the aperture formed by notches 16 and 27 to lift the lateral edge portion 22b of the connecting member at the right side of link casing 10 over the projection 15 of link casing 10.

Projections 13 and 15 on link casing 10 do not only limit the extent to which the strap may be expanded, but they also prevent the connecting elements from being pivoted excessively relative to link casings 10, since beyond a certain degree of curvature of the strap they will, in cooperation with slots 26, firmly abut against the inner surface of cover plate 21 of connecting elements 20.

Figs. 6 to 10 illustrate a modification of the invention, differing, however, from the first embodiment as above described only in minor details. Each link casing 40 is likewise made of a piece of sheet metal which is bent so that the outer end of the upper wall 41 rests flat upon the free outer edge surface of side wall 42a and is likewise provided with an upwardly bent edge portion 43 which has a central recess through which an extension 44 of side wall 42a projects. Directly opposite to extension 44, a portion 45 is partly severed from the upper wall 41 and bent upwardly so as to form an upward projection within the vertical plane of side wall 42b. Contrary to projection 15 as shown in Fig. 4, projection 45 does not have any central notch, but side wall 42b is also provided with a pair of slots 47 extending inwardly from the outer ends thereof. The upper wall 41 of the link casing further has a pair of slots 46 extending inwardly from its outer ends. These slots 46 are, however, shorter than slots 47 in side wall 42b and they are spaced from projections 43 at a distance corresponding to the thickness of the material of springs 60 plus that of tabs 54 on connecting elements 50.

Like in the first embodiment, each connecting element 50 consists of a plate 51 of a rectangular inverted trough-like shape with lateral edge portions 52a and 52b. However, edge portion 52b does not have any central notch, but edge portion 52a has a central recess 58 similar to recess 28 in Fig. 3 and of a width corresponding to the width of projection 45 on the upper wall 41 of the link casing. Springs 60 may also be similar to those of the first embodiment and be similarly disposed within each link casing.

After springs 60 have been inserted into link casing 40, the longer tabs 54 of the first connecting element 50 are inserted through the corresponding slots 47 in the manner as illustrated in Fig. 9, and this element is then tilted over and moved to the position as shown in Fig. 10 after compressing springs 60. When the spring ends are pressed down flat against side wall 42a by tabs 54, the shorter slots 46 in the upper wall 41 of casing 40 will be exposed so that tabs 53 of the second connecting element 50 may then be inserted from above into casing 40 through these slots 46, as indicated in Fig. 10.

Again as shown in the first embodiment, tabs 53 and 54 of each connecting element are separated from the lateral edge portions 52a and 52b, respectively, by slots 56 of a width substantially corresponding to the thickness of the material of the upper wall 41 of casing 40. However, slots 56 at the side of the longer tabs 54 have enlarged recesses 57 near their closed ends. These recesses 57 should be at least as long as slots 46 in the upper wall 41 of the casing so that, when the strap is being expanded, the edges of the narrower end portion of slots 56 will slide along the upper and lower surfaces of the upper wall 41 without coming into any engagement with the edges of slots 46. Any binding or locking action between link casings 40 and connecting elements 50 caused by an interengagement of the two pairs of slots 46 and 56 or their edges will thus be completely avoided.

Fig. 11 illustrates a modification of the embodiment of the invention as shown in Figs. 6 to 10. Instead of providing a slot 46 at each end of the upper wall 41 of the link casing, a single slot 48 may also suffice, provided such slot is of a length at least equal to the length of the respective tab 53 which is to be inserted therein and extends from a point at one end of wall 41 and spaced therefrom at a distance corresponding to the combined thickness of the material of spring 60 and tab 54 in a substantially diagonal direction toward the opposite side and end of wall 41. After the first connecting element 50 has been inserted into link casing 40 in the manner as previously described with respect to Figs. 6 to 10, the second connecting element 50 may be inserted in the manner as shown in Fig. 11, namely, by first inserting the upper tab 53 into the open end of casing 40 and by then pivoting the connecting element relative to casing 40 and passing the lower tab 53 through the inclined slot 48 into casing 40.

Figs. 12 to 15 illustrate four additional possibilities in which the inventive concept may be applied to the link casing. The butt joint is located in all four embodiments within the upper wall of the casing, and the stoplike projections are either designed so as to prevent the respective butt joint from being bent apart and opened when the strap is being pulled or bent excessively, or even so as to insure that the tensile stresses exerted by the tabs of the connecting elements upon the side walls of the link casings will tend to close the butt joint and to close the same the more firmly the more these forces increase.

Of these four embodiments, those illustrated in Figs. 12 and 13, on the one hand, and those illustrated in Figs. 14 and 15, on the other hand, are basically the same. Fig. 12 again shows a link casing 70 with a projection 75 which is cut out at three sides from the upper wall 71 and bent upwardly so as to be within the vertical plane of side wall 72b. The upper wall 71, however, does not extend along its entire length toward the opposite side wall 72a, but only by means of two portions 74, the ends of which rest flatly upon a pair of free upper end portions of side wall 72a and then extend vertically upward to form a pair of stoplike projections 73. Side wall 72a further has a pair of outer extensions 76a and 76c and a central extension 76b which are bent over at a right angle and abut against the corresponding recessed edges of the upper wall 71. The butt edge 78 therefore extends along a polygonal line within the upper wall 71. The adjacent edges of the central part of the butt joint are provided with an aperture or bore 79 into which a pointed tool may be inserted for spreading all of the edges of the butt joint so far apart against the resilient action of side walls 72a and 72b that tabs 53 and 54, respectively, of two connecting elements similar to those shown in Figs. 7 and 8 may be inserted through the slots thus formed between the edges on extensions 76a and 76c and the recessed portions of wall 71. Since the insertion of the tabs of the first connecting element requires that the outer ends of the springs be pressed toward side wall 72a, the other side wall 72b is preferably provided with a pair of apertures 77 through which a suitable tool, for example, one of a bifurcated shape, may be inserted to push the spring ends at least beyond the insertion slot formed by the opened butt joint 78.

Since the butt joint 78 of link casing 70 according to Fig. 12 begins and terminates at the center of the width of the upper wall 71, it may occur that, when the strap is being expanded and the abutting edges of extensions 76a and 76c and upper wall 71 are not accurately aligned or flush with each other, the projecting edges might interfere with the free movement of the tabs of the connecting members or even of the springs within the casings. Although such possibility is remote because of the central location of these abutting edges, it may be avoided entirely by designing the link casing 80 as illustrated in Fig. 13. The principal part of the upper wall 81 continues also in this case from side wall 82b to the opposite side wall 82a and there terminates in an upwardly bent projection 83, while side wall 82a also has extensions 86a and 86b which are bent at a right angle so as to abut against the upper wall 81. However, instead of placing those parts of the butt joint which are disposed within the area of tabs 53 and 54 of the inserted connecting elements centrally of the width of the link casing, it has been found advisable to start the butt joint 88, as shown in Fig. 13, at each end of casing 80 at a point directly adjacent to the upper bent edge between side wall 82a and the extensions 86a and 86b and to extend the joint first for a distance corresponding substantially to the length of tabs 54 in a diagonal direction toward the opposite end and the opposite side of wall 81, and then back outwardly toward the ends of projection 83 which is disposed in the same vertical plane as side wall 82a. The two extensions 86a and 86b are thus given a triangular shape. At the apex of each triangle the butt joint 88 is provided with a small aperture or bore 89 through which the abutting edges may be spread apart to permit tabs 53 and 54, respectively, of two adjacent connecting elements 50, according to Figs. 7 and 8, to be inserted into casing 80. While in the previous embodiments the link casings were shown as being provided with two springs, Fig. 13 also illustrates that one spring 90 may be sufficient. Similarly as in Fig. 12, side wall 82b according to Fig. 13 is also provided with a pair of apertures 87 for the insertion of a bifurcated tool to push the two ends of spring 90 against side wall 82a so that tabs 54 of the first connecting element may then be inserted into casing 80.

The link casings as illustrated in Figs. 14 and 15 are designed so that the butt joint will be closed the more firmly and tightly, the more the strap is being pulled apart. For this purpose, the upper wall of the link casing 100, as shown in Fig. 14, has a pair of outer portions 101a adjacent to the outer ends thereof and extending from side wall 102b approximately to the center of the width of the upper wall, where they are offset at right angles and are reduced to a narrower width. These narrower inward portions then extend to the other side wall 102a and are there bent upwardly to form projections 103. Side wall 102a is provided with a central extension 101b which is bent over at a right angle and also extends approximately to the middle of the upper wall. The wall portions 101a and 101b which are secured to side wall 102b are complemented to form a continuous rectangular surface by means of a pair of outer wall portions 101c and a central U-shaped portion 101d, all of which form bent-over extensions of side wall 102a. The two arms of the central U-shaped portion 101d extend to the other side wall 102b and there terminates in a pair of upwardly bent projections 104 which are disposed within the same vertical plane as side wall 102b, while the two outer portions 101c and the central part of the U-shaped portion 101d abut against the corresponding ends of portions 101a and 101b to form a butt joint 108. The abutting edges of the two central portions 101b and 101d also have an aperture 109 for the insertion of a pointed tool to permit the abutting outer wall portions 101a and 101c to be spread apart so that the tabs of the two connecting elements may be inserted through the gap into casing 100 after a bifurcated tool has been inserted into the aperture 107 in side wall 102b to push the ends of the spring or springs toward side wall 101a and away from the mentioned gap between wall portions 101a and 101c.

Fig. 15 finally shows a modification of a link casing of the type as shown in Fig. 14 which, however, has the advantage that the butt joint 118 within the upper wall 111 does not extend to the outer ends thereof and that its edges can therefore not interfere with the movement of the tabs of the connecting elements or of the springs within casing 110. The upper wall 111 of this casing is therefore provided with a pair of slots 116 and 117 similar to slots 46 and 47 in the casing according to Fig. 6 to permit the insertion of the tabs of the connecting elements. As illustrated in Fig. 15, the upper wall 111 consists of two angular parts 111a extending from side wall 112a and terminating into upward projections 114 in the vertical plane of side wall 112b and an angular central part 111b extending from side wall 112b toward wall 112a and terminating into an upward projection 113. The two sets of wall portions interengage with each other so that, when the two connecting elements in each casing are pulled apart, such pull tends to close the polygonal butt joint 118 and closes it the more firmly, the greater the pulling force might be.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An elastic link strap comprising a plurality of link casings forming a single layer, each extending transverse to the direction of expansion of the strap and being bent into the shape of a tubular casing from a piece of sheet metal so as to have a butt joint and open ends, a plurality of connecting elements, each of said elements connecting two adjacent casings with each other, and at least one bent leaf spring within each casing, said spring having a free outer end adjacent each end of said casing, each of said elements having end walls, a cover plate connecting said end walls and hollowed out at its lower side so as to form lateral edge portions on each side of said element transverse to the longitudinal direction of the strap, each of said elements having a pair of tabs projecting from each of said end walls, said tabs being spaced from and parallel to said lateral edge portions, a pair of said tabs extending into the open ends of each of two adjacent casings to connect said casings to each other, said tabs having a height substantially corresponding to the inner height of said casings, one tab of each of said pairs being adapted to engage and act upon the outer ends of said spring within said casing and thus being slidable within said casing against the action of said spring, each of said cover plates being adapted to cover substantially all of one of said casings when the strap is contracted, and to cover the gap formed intermediate said adjacent casings when the strap is expanded, each of said casings having upper and lower walls and a first and a second side wall, a portion of said butt joint being formed by part of said upper wall resting flatly at one end on the free end of said first side wall, a first projection coinciding substantially with the vertical plane of said first side wall, said first projection being formed by an upwardly bent portion of said upper wall, and at least one second projection at the opposite side of said upper wall, said second projection extending upwardly substantially within the vertical plane of said second side wall, said first and second projections extending into the hollow recess within said cover plate of the connecting elements, each of said first and second projections being adapted to engage with one of the lateral edge portions of corresponding adjacent cover plates when the strap is in its fully expanded condition and when the forces exerted by the expansion of the strap exceed the strength of said springs within the casings, whereby said forces are transmitted by said first and second projections to said upper walls of said casings and are neutralized therein without forcing said butt joint open, the extent to which the strap may be bent in a curved path being limited by the engagement of said first and second projections with the cover plates of said connecting elements.

2. An elastic link strap as defined in claim 1, wherein said second projection is formed by a portion being partly cut out from said upper wall and being bent upwardly substantially within the vertical plane of said second side wall of said casings.

3. An elastic link strap as defined in claim 2, wherein said first projection of said upper wall has a central recess, and said first side wall has an upward extension of a width corresponding to the width of said recess and projecting through said recess.

4. An elastic link strap as defined in claim 2, wherein said second side wall of each casing extending within the same plane as said cutout projection has a pair of slots extending inwardly from the outer ends thereof, whereby the tabs on said connecting elements may be inserted into or removed from said link casing through said slots.

5. An elastic link strap as defined in claim 3, wherein one of said lateral edge portions of said cover plate which is adapted to engage with said first projection of said upper wall and said upward extension of said first side wall has a recess therein of a width substantially corresponding to the width of said cutout projection at the other side of said upper wall.

6. An elastic link strap as defined in claim 2, wherein said cutout projection has a notch in its upper edge, and the lateral edge portion of said cover plate which is adapted to engage with said cutout projection has a similar notch adapted to coincide with said first notch so that both notches together form an aperture whereby, when said casing and connecting elements are being assembled, a pointed tool may be inserted through said aperture to move said lateral edge portion of said cover plate over the upper edge of said cutout projection.

7. An elastic link strap as defined in claim 2, wherein said upper wall of said casing has at least one slot extending inwardly from an outer end thereof and adjacent to said upwardly bent edge portion of said upper wall, and spaced from said edge portion and the inner surface of the adjacent side wall at a distance substantially corresponding to the combined thickness of the material of said inserted spring and the tabs of the connecting element engaging with said spring whereby, when the strap is in the expanded position, a tab of one of the connecting elements may be inserted into or removed from each casing through said slot.

8. An elastic link strap as defined in claim 2, wherein said upper wall of said casing has a pair of slots extending inwardly from the outer ends thereof and adjacent and parallel to said upwardly bent edge portion of said upper wall, and spaced from said edge portion and the inner surface of the adjacent side wall at a distance substantially corresponding to the combined thickness of the material of said inserted spring and the tabs of the connecting element engaging with said spring whereby, when the strap is in the expanded position, said tabs of one of the connecting elements may be inserted into or removed from each casing through said slots.

9. An elastic strap as defined in claim 2, wherein said upper wall of said casing has a single slot of a length substantially equal to the length of one of said tabs of the second connecting element inserted into said casing and starting from a point at one end of said upper wall near the inner surface of the adjacent side wall but at a distance therefrom substantially corresponding to the combined thickness of the material of said inserted spring and the tabs of the connecting element engaging with said spring, and extending from said point in a substantially diagonal direction toward the opposite end and side of said upper wall, whereby, when the strap is in the expanded position and said second connecting element is held at an angle to the longitudinal direction of the strap, one of the tabs at one side of said connecting element may be inserted into or removed from said casing through said diagonal slot, while the opposite tab at the same side of said connecting element may be inserted into or removed from the opposite open end of said casing.

10. An elastic link strap as defined in claim 7, wherein the two pairs of tabs on each connecting element are of different length, said side wall of each casing extending within the same plane as said cutout projection having a pair of slots therein extending inwardly from the outer ends thereof and each having a length substantially corresponding to the length of one of the tabs of one pair and adapted for the insertion of said pair of tabs of one connecting element into said casing, said slot in said upper wall being shorter than said slots in said side wall and of a length substantially corresponding to the length of one of the tabs of the other pair and adapted for the insertion of one of the tabs of the other pair of the second connecting element into said casing.

11. An elastic link strap as defined in claim 1, wherein said butt joint of each link casing is disposed within said upper wall thereof carrying said projections and is covered by said cover plates of two adjacent connecting elements at least when said strap is in the contracted position, said butt joint extending within said upper wall along a polygonal line thereby dividing said upper wall into two parts, one of said parts being integrally connected with one of said side walls and extending to the opposite side wall, said part having said first and second projections formed thereon within the planes of said side walls, respectively so that the tensile stresses transmitted to said projections when the strap is being expanded or bent are taken up by said part of said upper wall carrying said projections.

12. An elastic link strap as defined in claim 1, wherein said butt joint is formed by dividing said upper wall of said casing into a plurality of interengaging portions, at least one of said upper wall portions being integrally secured to one of said side walls and at least one other upper wall portion being integrally secured to the other side wall, each of said integral upper wall portions extending from one of said side walls to the other side wall, respectively, and there terminating in at least one of said upwardly bent first and second projections, respectively, within the vertical planes of said side walls so that the tensile stresses transmitted to said first and second projections during expansion and bending of the strap tend to close said butt joint.

13. An elastic link strap as defined in claim 1, wherein said butt joint is formed by dividing said upper wall of said casing into a plurality of interengaging portions, each of said upper wall portions being integrally secured to one side wall or the other and each extending from one of said side walls to the opposite side wall and terminating at said opposite side wall into at least one of said upwardly bent projections within the vertical plane of the respective side wall.

14. An elastic link strap as defined in claim 11, wherein said polygonal butt joint starts at each end of said upper wall of said casing at a point directly adjacent to the juncture of said upper wall and one side wall, and extends from said points for a distance substantially corresponding to the length of said tabs of said connecting elements in a substantially diagonal direction toward the opposite end and the opposite side of said upper wall.

15. An elastic link strap as defined in claim 12, wherein the abutting edges of the upper wall portions forming said butt joint are provided with at least one aperture, whereby a tool may be inserted through said aperture to bend said abutting edges so far apart against the resilient action of said side walls that a gap will be formed through which the tabs of said connecting elements may be inserted into or removed from said casing.

16. An elastic link strap as defined in claim 11, wherein one of said side walls of said casing has at least two apertures therein, whereby a tool may be inserted through said longer tabs of the first-inserted connecting element so in said casing toward the opposite side wall to permit the tabs on the connecting element which are adapted to engage with said spring ends to be inserted into said casing.

17. An elastic link strap as defined in claim 1, wherein one pair of tabs on one side of each connecting element transverse to the longitudinal direction of the strap has a length different from the pair of tabs on the other side, one side wall of said casing having two slots extending inwardly from its ends and adapted to receive the longer tabs of one connecting element for their insertion into said casing and for the subsequent engagement of said tabs with the ends of said spring, said longer tabs being adapted to displace said spring ends when the strap is being expanded, said upper wall of said casing having a pair of slots extending inwardly from its outer ends at a point near the side wall opposite to said slotted side wall, the shorter tabs of the second connecting element being adapted to be inserted into said casing through said last slots after said spring ends have been flattened by said longer tabs of the first-insered connecting element so that, when the strap is assembled, the shorter tabs of the second connecting element will then engage against said slotted side wall of said casing.

18. An elastic link strap as defined in claim 17, wherein said longer tabs and an adjacent edge of said cover plate define a pair of elongated apertures in said connecting elements, the open ends of the apertures in said connecting elements having a width substantially corresponding to the thickness of the material of said upper wall of said casing, said apertures also having a portion of greater width adjacent to their closed ends and of a length substantially equal to the length of said slots in said upper wall of said casing.

19. An elastic link strap as defined in claim 11 wherein the abutting edges of the upper wall parts forming said butt joint are provided with at least one aperture, whereby a tool may be inserted through said aperture to bend said abutting edges so far apart against the resilient action of said side walls that a gap will be formed through which the tabs of said connecting elements may be inserted or removed from said casing.

References Cited in the file of this patent

UNITED STATES PATENTS

| | | |
|---|---|---|
| 1,659,438 | Nelson | Feb. 14, 1928 |
| 1,661,869 | Augenstein et al. | Mar. 6, 1928 |
| 1,700,293 | Lederer | Jan. 29, 1929 |
| 2,732,684 | Augenstein | Jan. 31, 1956 |
| 2,866,312 | Kussmaul | Dec. 30, 1958 |

FOREIGN PATENTS

| | | |
|---|---|---|
| 213,632 | Great Britain | Apr. 1, 1924 |